(12) United States Patent
Engel et al.

(10) Patent No.: US 6,850,404 B2
(45) Date of Patent: Feb. 1, 2005

(54) COMPONENT AND INTERFERENCE SUPPRESSION CIRCUIT

(75) Inventors: Günter Engel, Leibnitz (AT); Günther Greier, Graz-St. Peter (AT); Walter Wittmer, St. Genis Pouilly (FR)

(73) Assignee: EPCOS AG, Munich (DE)

(*) Notice: Subject to any disclaimer, the term of this patent is extended or adjusted under 35 U.S.C. 154(b) by 0 days.

(21) Appl. No.: 10/451,051

(22) PCT Filed: Dec. 6, 2001

(86) PCT No.: PCT/DE01/04591
§ 371 (c)(1),
(2), (4) Date: Jan. 16, 2004

(87) PCT Pub. No.: WO02/052614
PCT Pub. Date: Jul. 4, 2002

(65) Prior Publication Data
US 2004/0114305 A1 Jun. 17, 2004

(30) Foreign Application Priority Data
Dec. 22, 2000 (DE) .......................... 100 64 447

(51) Int. Cl.⁷ ................................................ H01G 4/30
(52) U.S. Cl. ................. 361/301.4; 361/306.3; 361/306.1
(58) Field of Search .............................. 361/301.4, 303, 361/306.1, 306.3, 321.2, 328–329; 333/184–185, 172

(56) References Cited

U.S. PATENT DOCUMENTS

| 5,430,605 A | 7/1995 | DeNeuf et al. |
| 5,815,367 A | 9/1998 | Asakura et al. |
| 5,870,273 A | 2/1999 | Sogabe et al. |
| 5,880,925 A | 3/1999 | DuPre et al. |
| 5,889,445 A * | 3/1999 | Ritter et al. ............... 333/172 |
| 2001/0035810 A1 | 11/2001 | Heistand, II et al. |

FOREIGN PATENT DOCUMENTS

| DE | 43 42 818 | 6/1994 |
| DE | 196 39 947 | 4/1998 |
| DE | 196 34 498 | 1/1999 |
| DE | 199 31 056 | 1/2001 |
| EP | 0 865 053 | 2/1998 |
| EP | 0 936 642 | 2/1999 |
| JP | 01-107511 | 4/1989 |
| JP | 04-038810 | 2/1992 |
| JP | 11-251178 | 9/1999 |
| JP | 11-288846 | 10/1999 |

* cited by examiner

Primary Examiner—Anthony Dinkins
(74) Attorney, Agent, or Firm—Fish & Richardson P.C.

(57) ABSTRACT

An electrical component includes stacked electrode layers arranged on a foundation. The stacked electrode layers include a first type of electrode layer and a second type of electrode layer. Dielectric layers separate the stacked electrode layers to form at least one capacitor. Two pairs of external contacts are arranged such that one external contact in each pair of external contacts is located on a side of the foundation and such that connections between each pair of external contacts overlap. A first pair of the external contacts connects to the first type of electrode layer and a second pair of the external contacts connects to the second type of electrode layer. The first type of electrode layer includes a first conductive layer which connects to at least one of the first pair of external contacts and the second type of electrode layer includes a second conductive layer which connects to at least one of the second pair of external contacts.

19 Claims, 5 Drawing Sheets

COMPONENT AND INTERFERENCE SUPPRESSION CIRCUIT

CROSS-REFERENCE TO RELATED APPLICATIONS

This application claims priority to PCT Application No. PCT/DE 01/04591, filed on Dec. 6, 2001, and to German Patent Application No. 100 64447.3, filed on Dec. 22, 2000.

FIELD OF THE INVENTION

The invention concerns an electrical multi-layered component comprising a foundation that has stacked electrode layers of a first kind and a second kind. The electrode layers are separated from each other by dielectric layers and form at least one capacitance. Two pairs of external contacts are located on the sides of the foundation. The direct connections of the external contacts, each belonging to a pair, cross each other. The first pair of external contacts is connected to the electrode layers of the first kind and the second pair of external contacts is connected to the electrode layers of the second kind.

BACKGROUND

From the printed documentation of U.S. Pat. No. 5,889,445, components of the above-mentioned type are known in which one external contact each is located at both ends and at two long sides. The professional knows these components also under the name "feed-through components". The external contacts located at the ends are applied by dipping the foundation in an electrically conductive paste and fit therefore over the ends like a cap. Because of the location of the external contacts and the way they are manufactured, the known component has the disadvantage that its dimensions cannot be reduced to less than 2.0 mm in length and 1.25 mm in width, because the external contacts must have a minimum separation from each other so as to avoid short circuits through surface currents.

Current designs for cell phones require smaller dimensions than the ones mentioned above, which is the reason why the known components cannot be considered for this type of application.

The relatively large dimensions of the known components also have the disadvantage that they result in a large parasitic inductance that has a negative effect on the attenuation properties of the component used in cell phones as a noise suppression component to filter out interfering frequencies.

The known components can be used as varistors by using varistor ceramics in the dielectric layers, but even here the large dimensions of the component are a disadvantage, in particular with regard to parasitic inductances as well as relatively high terminal voltages with steep-sided pulses.

The known component also has the disadvantage that four different sides of the foundation have to be coated when applying the external contacts, resulting in a large expense, for example for the turning of the component.

SUMMARY

It is therefore the objective of the subject invention to indicate a component of the kind described in the introduction that can be miniaturized and that is easy to manufacture. This objective is achieved according to the invention by an electrical multi-layered component according to patent claim 1. Other embodiments of the invention as well as suppressor circuits with the multi-layered component according to the invention can be seen in the further claims.

The invention indicates an electrical multi-layered component comprising a foundation that has stacked electrode layers of a first kind and a second kind. The foundation also has dielectric layers that separate the electrode layers from each other, whereby at least one capacitance is formed. Two pairs of external contacts are located on opposing sides of the foundation, with one external contact each from each pair being located on each side. Also, the external contacts are arranged in such a way that the direct connections of the external contacts, each belonging to a pair, cross each other. For example, a cubic foundation may be used for the invention, whereby a virtually diagonal feed-through path can be achieved by arranging the external contacts near the corners of the cube.

The first pair of external contacts is connected to the electrode layers of the first kind and, correspondingly, the second pair of external contacts is connected to the electrode layers of the second kind. The electrode layer of the first kind contains a conductive layer that connects two external contacts with each other. The electrode layer of the second kind also contains a conductive layer connected to one of the external contacts.

The multi-layered component according to the invention has the advantage that the external contacts are located only on two of the sides of the foundation. This makes them very easy to manufacture because the component has to be turned only once for applying the external contacts. The multi-layered component according to the invention also has the advantage that smaller designs are feasible by applying the external contacts to two opposing sides of the foundation. This is especially true because the other sides that do not have external contacts can serve as space holders between the external contacts. This provides good insulation from each other for the external contacts.

Smaller designs have the advantage of smaller parasitic inductances, giving the multi-layered component according to the invention better attenuation properties for use as a noise suppression component.

If in addition one of the dielectric layers is configured as a varistor layer, there is another advantage in the form of a smaller terminal voltage as a result of the reduced component inductance.

In an especially advantageous embodiment of the invention, the external contacts are located on the flat sides of the foundation. In this case the external contacts can be attached to the foundation with special ease by applying a paste or also by other suitable means. In particular, in this case the external contacts can be manufactured easily and inexpensively by rolling a wheel coated with a conductive material over the flat sides. This simple possibility of manufacturing the external contacts offers another advantage, namely the possibility to manufacture structures with a precisely defined space, making a further miniaturization of the component feasible.

In using a foundation with a bottom and a top, with one of these intended to be mounted on a circuit board, the external contacts can very advantageously be arranged on those sides of the foundation that have the least distance from each other. If a foundation in the form of a cube is used, the broad sides of the cube would be the ones to support the external contacts. Such a component has the advantage of a yet lower inductance since short paths for the currents can be achieved as a result of the small distance of the sides from each other.

Such an embodiment of the component according to the invention has the further advantage that by narrowing the foundation and by simultaneously lengthening the foundation a still lower parasitic inductance can be achieved without having to forgo the high capacitance.

At least one of the dielectric layers can be executed as a varistor layer with a voltage-dependent resistance. Such a component has the advantage that one or also two condensers can be integrated into a single component together with a voltage-dependent resistance (VDR). Thus protection against ESD (electrostatic discharge) can be achieved in addition to the noise suppressor function.

For example, a so-called "COG" ceramic can be used as a dielectric layer. Such a material would be, for example, a (Sm, Ba) NdTiO3 ceramic. However, also an "X7R" ceramic can be considered, such as for example doped barium titanate. A very suitable varistor layer with voltage-dependent resistance is for example a zinc oxide ceramic doped with praseodymium or bismuth oxide.

In one embodiment of the invention, in which a single capacitance is contained in the multi-layered component, the electrode layer of the second kind is executed in such a way that it contains a conductive layer connecting two external contacts with each other.

In a further embodiment the multi-layered component according to the invention may also contain two capacitances, whereby two conductive layers spatially separated from one another are contained in an electrode layer, each of which is connected to an external contact and which belong to two capacitances separated from each other.

For the event that the component according to the invention contains two capacitances, it is especially beneficial if two spatially separated conductive layers are contained in one electrode layer of the first kind, which are connected in an electrically conductive manner with one external contact each. Also, the spatially separated conductive layers are connected to each other via a resistance layer. This makes a π circuit feasible in which two capacitances are connected to each other via a resistance represented by the resistance layer. Such a π circuit has a better attenuation behavior, making it possible to attenuate an entire frequency band running between the two attenuation frequencies defined by the capacitances.

In one variant of this embodiment the electrode layer of the first kind can be configured entirely as a resistance layer connecting two external contacts with each other.

In a further variant of this embodiment a resistance layer can be located on the surface of the foundation that connects the first pair of external contacts to each other.

It is also especially advantageous if a conductive layer and/or a resistance layer of the component has at least one narrow pass. The introduction of one or more narrow passes allows for a targeted setting of the electrical properties of the component. Such electrical properties as can be set through the introduction of a narrow pass are for example the inductance, the electrical resistance or also the capacitance. The resonance curve of the component required for the attenuation can thereby be brought into a suitable form.

The resistance layer that might be contained in the component according to the invention, as the case may be, can also be manufactured advantageously from a paste containing ruthenium. Normally, a silver paste is used for manufacturing the conductive layer. By adding ruthenium to the silver paste, the electrical resistance is increased, without that the ruthenium can impair the advantageous properties of the silver in the paste.

The component according to the invention may also be manufactured especially advantageously by sintering a pile of ceramic green foils stacked one on top of the other. This creates a monolithic, compact component that can be manufactured very rapidly and simply in large numbers.

In another advantageous embodiment of the invention, identical electrode layers of the first kind are stacked alternating with identical electrode layers of the second kind. Such a simplified design of the component has the advantage that it is easy to implement. The alternate stacks of electrode layers result in comb-like structures that are intertwined and form parallel capacitances. Thus a maximum capacitance is obtained with very small outer dimensions of the component.

The areas of the conductive layers of the electrode layers of the first kind and the second kind can differ from each other by as little as 10%, making it possible to achieve a multi-layered component with two almost identical capacitances.

However, a component with different capacitances is also possible when the areas of the conductive layers in the electrode layer of the first kind differ by more than 20%. This is due to the fact that the size of the capacitance is essentially determined by the area of the electrodes of the condenser.

The component according to the invention may in particular be executed in miniaturized form, with the base area of the foundation amounting to less than 2.5 mm². Such a base area could for example be achieved by designing a foundation with a length of 1.25 mm and a width of 1.0 mm. This design is also known under the name "0405".

Furthermore, the invention indicates a noise suppression circuit with a component according to the invention in which the component is located on a circuit board together with an identical second component. The exterior areas of the foundations of the components equipped with external contacts are vertical to the circuit paths of the circuit board, which in turn run along three parallel straight lines. Two of the external contacts at a time are located along the two outside straight lines and four external contacts are located along the inside straight line, resulting in a very compact arrangement that facilitates the noise suppression of two lines requiring only a very small space.

In another advantageous development of the noise suppression circuit according to the invention, the circuit paths include a ground wire, which, in either case, runs along the outside edge of the three circuit paths and crosses the two other circuit paths in the component. Such a circuit has the advantage that the mass is conducted from one outside area to the other and can therefore be connected easily and with little space requirement for example to the ground connection of a shielded plug.

In what follows, the invention is explained in more detail with the use of the embodiment examples and the respective drawings:

DESCRIPTION OF THE DRAWINGS

The elements of FIGS. 3, 4, 5, 8, 9, 11 and 12 not shown with references correspond to the elements of FIG. 2.

DETAILED DESCRIPTION

Figure 1:
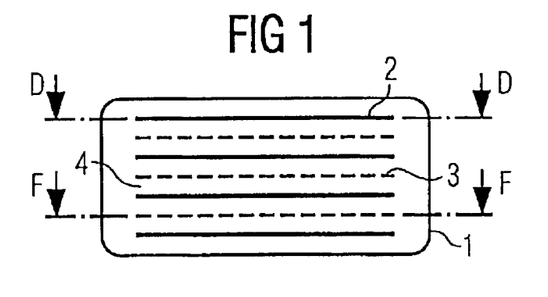
FIG. 1 shows an example of a component according to the invention in a schematic longitudinal section.

FIG. 1 shows a component according to the invention in a schematic longitudinal section with a foundation 1 and with electrode layers 2 of the first kind and with electrode layers 3 of the second kind. The electrode layers 2 of the first kind are stacked alternating with the electrode layers 3 of the second kind. The dielectric layers 4 are located between the electrode layers 2, 3. Such a parallel connection of partial condensers can be achieved by a suitable circuitry at the wheels of the component, resulting in a condenser with a comparably high capacitance.

Figure 2:
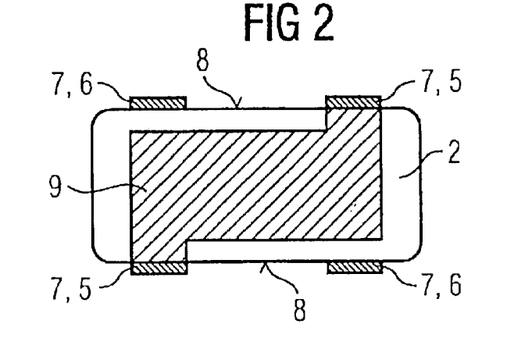
FIG. 2 shows the section D—D of FIG. 1.

FIG. 2 shows the section D—D of FIG. 1. The electrode layer 2 of the first kind comprises a conductive layer 9 that conductively connects the first pair 5 of external contacts 7 to each other. External contacts 7 are located on the two opposing sides 8 of the foundation. The four external contacts 7 are combined in pairs 5, 6, with an external contact 7 of each pair 5, 6 being located on each side 8.

Figure 3:
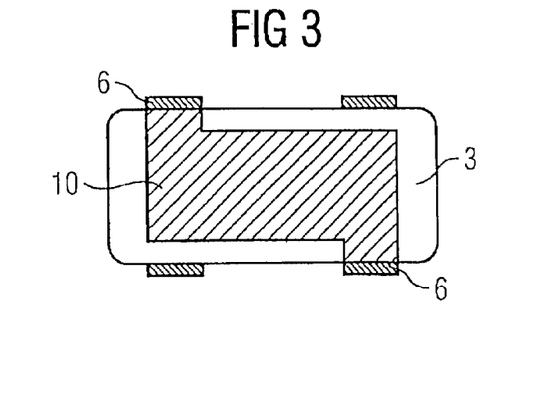
FIG. 3 shows the section F—F of FIG. 1.

FIG. 3 shows the section F—F of FIG. 1. The electrode layer 3 of the second kind shown in FIG. 2 comprises a conductive layer 10 that connects the second pair 6 of external contacts to each other. The other elements shown in FIG. 3 match those shown in FIG. 2.

Figure 4:
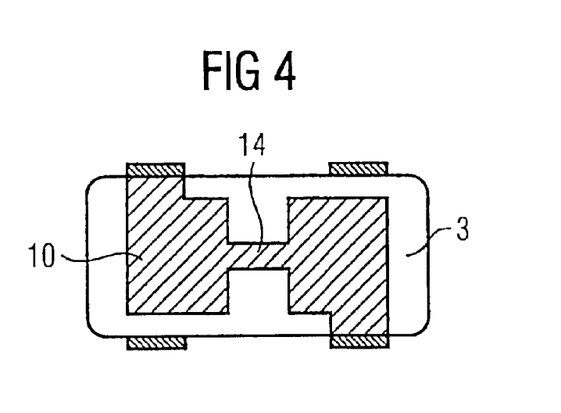
FIG. 4 shows the section F—F of a further embodiment example of a component according to FIG. 1.

FIG. 4 shows the section F—F in a variant of FIG. 1. The electrode layer 3 of the second kind shown in FIG. 4 has a conductive layer 10 with a narrow pass 14 located more or less in the middle.

Figure 5:
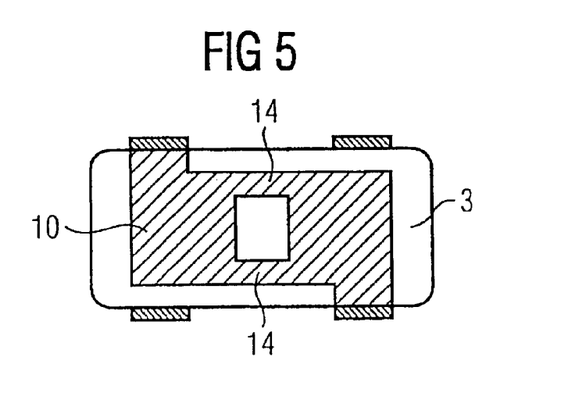
FIG. 5 shows the section F—F of a further embodiment example of a component according to FIG. 1.

FIG. 5 shows the section F—F according to a variant of FIG. 1. The electrode layer 3 of the second kind shown in FIG. 5 has a conductive layer 10 with two narrow passes 14.

Figure 6:
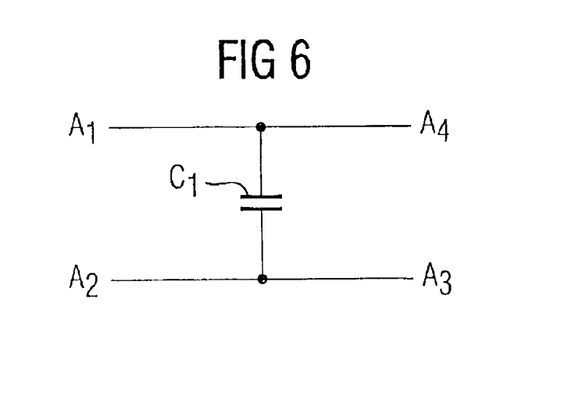
FIG. 6 shows schematically a substitute circuit diagram for the component shown in FIG. 1.

FIG. 6 shows schematically a substitute circuit diagram for a component configured according to FIG. 1, FIG. 2 and FIG. 3. The electrode layers can be combined into a condenser C1 by the parallel connection achieved with the help of external contacts. The connections A1 to A4 of FIG. 6 can be allocated to the external contacts 7 according to FIG. 2 as follows: A1 corresponds to the external contact 7 in the upper left, A2 corresponds to the external contact 7 in the lower left, A3 corresponds to the external contact 7 in the upper right, and A4 corresponds to the external contact 7 in the lower right.

Figure 7:
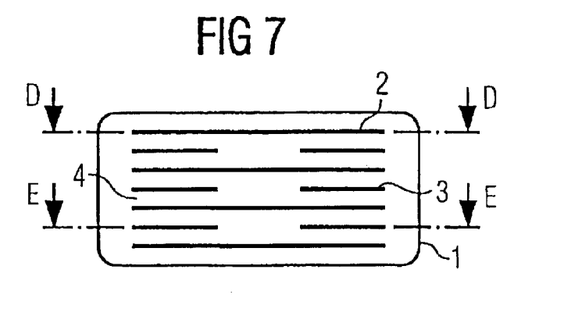
FIG. 7 shows an example of a further component according to the invention in a schematic longitudinal section.

FIG. 7 shows an example of a further component according to the invention with two capacitances in the schematic longitudinal section. The elements shown correspond to the ones in FIG. 1. The difference to FIG. 1 is that the conductive layers of the electrode layers 2, 3 have different shapes.

For example, the electrode layers 2 of the first kind can be executed in a way as shown in FIG. 2 according to the section D—D. The conductive layer 9 shown in FIG. 2 can also be a layer made of a resistance paste.

Figure 8:
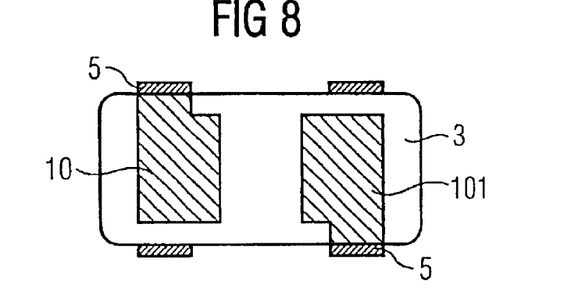
FIG. 8 shows the section E—E of FIG. 7.

FIG. 8 shows the section E—E of FIG. 7. The electrode layer 3 of the second kind shown in FIG. 8 comprises a conductive layer 10 and a conductive layer 101, both of which are conductively connected from the external contacts 7 with an external contact 7 of the second pair 5. A component with two capacitances can be achieved by configuring the electrode layer 3 of the second kind according to FIG. 8, whereby the conductive layers 10 and 101 belong to different capacitances. The conductive layers 10 and 101 have approximately the same area, giving also the two capacitances about the same magnitudes.

Figure 9:
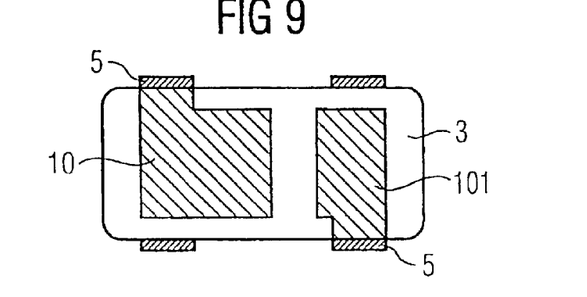
FIG. 9 shows the section E—E of a further embodiment according to FIG. 7

FIG. 9 shows the section E—E of a variant of FIG. 7. The electrode layer 3 of the second kind shown in FIG. 9 comprises two conductive layers 10, 101, which are connected to the first pair 5 of external contacts. The conductive layers 10 and 101 have noticeably different areas, making it possible to achieve a multi-layered component with two different capacitances.

Figure 10:
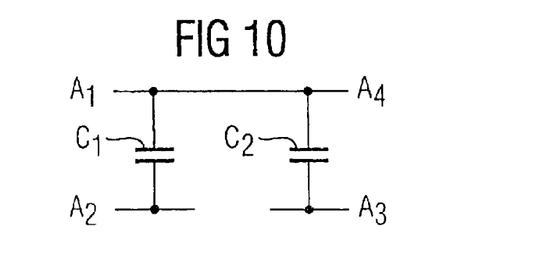
FIG. 10 shows schematically a substitute circuit diagram of a component according to FIG. 7.

FIG. 10 shows an example of a schematic substitute circuit diagram for a component according to FIG. 7. The two capacitances C1 and C2 are connected in parallel to each other. The allocation of the connections A1 to A4 occurs in the same manner as described in FIG. 6.

Figure 11:
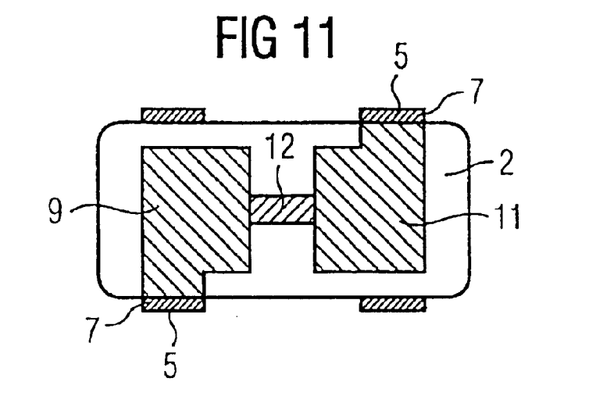
FIG. 11 shows the section D—D of FIG. 7.
Figure 13:
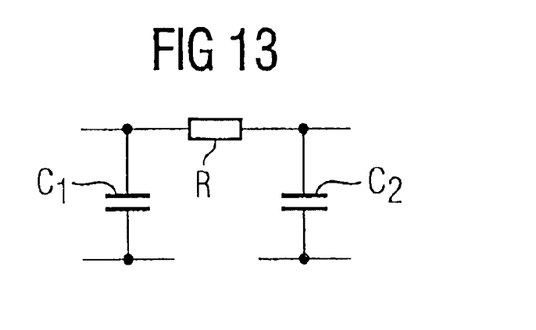
FIG. 13 shows schematically a substitute circuit diagram of a component according to FIG. 7 and FIG. 11.

FIG. 11 shows the section D—D in a variant of FIG. 7. The electrode layer 2 of the first kind shown in FIG. 11 has a conductive layer 9 connected to an external contact 7 of the first pair 5 from external contacts 7. The electrode layer 2 of the second kind also has a conductive layer 11 connected to the other external contact 7 of the first pair 5. The conductive layers 9, 11 are connected with each other through a resistance layer 12. With the resistance layer 12 a π circuit can be achieved as shown in FIG. 13, in which two capacitances C1 and C2 are connected to each other through a resistance R.

Figure 12:
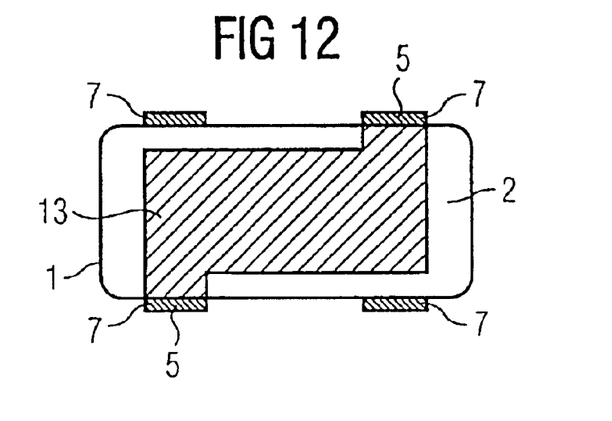
FIG. 12 shows the section D—D of a further embodiment according to FIG. 7.

FIG. 12 shows the section D—D of FIG. 7 for a variant of the component according to the invention. The electrode layer 2 of the first kind shown in FIG. 12 has a resistance layer 13 that connects the external contacts 7 of the first pair 5 with each other. Contrary to the arrangement of the electrode layer 2 of the first kind shown in FIG. 11, the conductive layer is entirely dispensed with. A ir filter with a resistance connecting two capacitances can be achieved, also according to FIG. 12.

FIG. 12 shows a component according to FIG. 7 as seen from above. A resistance layer 13 is applied to the upper surface of the foundation 1 that connects the first pair 5 of external contacts 7 to each other. The variant to FIG. 11 shown in FIG. 12 can, in the same way as resistance paste applied on the inside of the component, be used to achieve a π filter according to FIG. 13.

Figure 14:
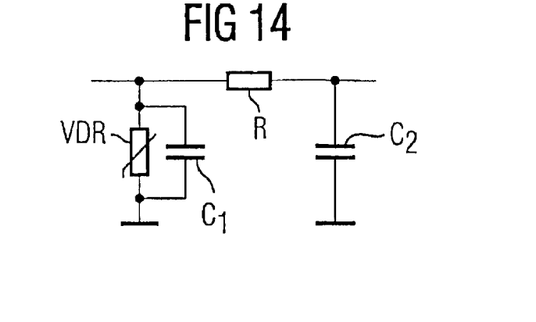
FIG. 14 shows schematically a substitute circuit diagram of a further component according to FIG. 7 and FIG. 11.

FIG. 14 shows schematically a substitute circuit diagram for a component according to the invention that is executed according to FIG. 7, FIG. 11 and FIG. 9. Moreover, a dielectric layer is executed as a varistor layer. Through the respective configuration of the component, it is possible to ensure that C1=60 pF and C2=25 pF. Also, the chosen resistance R was 10 Ω.

Figure 15:
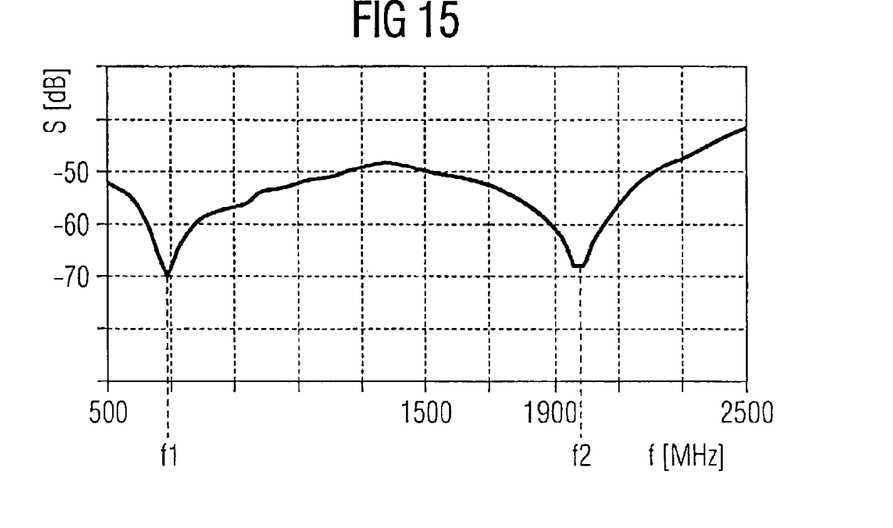
FIG. 15 shows schematically the attenuation behavior of a component according to FIG. 14.

FIG. 15 shows an insertion attenuation of the component shown in FIG. 14. The insertion attenuation S is applied via the frequency f. The two resonance frequencies, f1, f2, as defined through both C1, C2 capacitances, show an increased attenuation. The component shows a very good attenuation also between the resonance frequencies f1, f2 because of the resistance R implementing the π circuit, making the component suitable for noise suppression in a frequency band that lies between the resonance frequencies f1 (belongs to C1) and the resonance frequency f2 (belongs to C2).

The capacitances C1 and C2 define the resonance frequencies f1 and f2 respectively, which are shown in FIG. 15.

Figure 16:
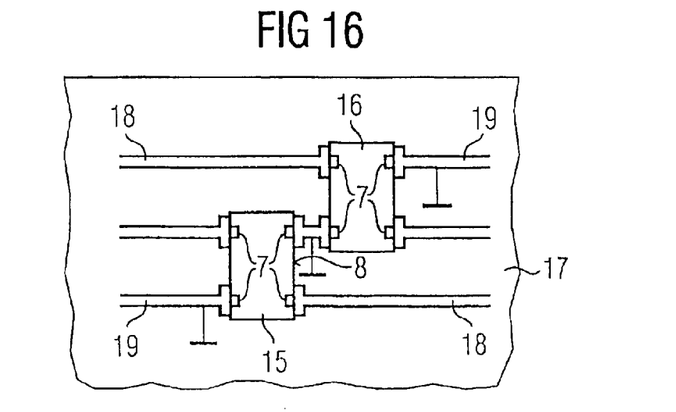
FIG. 16 shows an example of a noise suppression circuit according to the invention seen from above.

FIG. 16 shows a noise suppression circuit according to the invention as seen from above. A first component 15 according to the invention and a second component 16 according to the invention are located on a circuit board 17. The external contacts 7 of the components 15, 16 are located along three parallel straight lines. Two external contacts 7 each are located along the outer straight line. Four external contacts 7 are located along the straight line in the middle. Circuit paths 18 run on the circuit board 17 along the straight line in the middle. The lower circuit paths 18 on the left and the upper circuit paths 18 on the right are executed as ground wire 19. In the components 15, 16, the ground wire 19 crosses the two other circuit paths 18. The arrangement shown in FIG. 16 has the advantage that it is very compact and that the ground wire 19 can be placed at the edge of the group of circuit paths 18.

The invention is not limited to the examples of embodiment shown above, but rather is defined in its general form by patent claim 1.

What is claimed is:

1. A component comprising:
   a foundation;
   stacked electrode layers arranged relative to the foundation, the stacked electrode layers comprising a first type of electrode layer and a second type of electrode layer;
   dielectric layers separating the stacked electrode layers to form at least one capacitor; and
   two pairs of external contacts arranged on opposite sides of the foundation in such that of one external contact in each pair of external contacts is located on a each side of the foundation, and such that connections between each pair of external contacts overlap;
   wherein a first pair of the external contacts connects to the first type of electrode layer, and a second pair of the external contacts connects to the second type of electrode layer; and
   wherein the first type of electrode layer comprises a first conductive layer which connects the first pair of external contacts and the second type of electrode layer comprises a second conductive layer, which connects to at least one of the second pair of external contacts is connected to an external contacts.

2. The component according to claim 1, wherein the two pairs of external contacts are located on flat sides of the foundation.

3. The component according to claim 1, wherein the two pairs of external contacts are located on sides of the foundation that are not parallel to the electrode layers.

4. The component according to claim 1, wherein at least one of the dielectric layers comprises a varistor layer with voltage-dependent resistance.

5. The component according to claim 1, wherein the second a conductive layer connects the second pair of we external contacts.

6. The component according to claim 1, wherein the second conductive layer comprises two spatially separated conductive layers which are each connected to one external contact of two separate capacitors formed in the component.

7. The component according to claim 1, wherein the first conductive layer comprises two spatially separated conductive layers which are each connected to one external contact, the component further comprising a resistive layer that connects the two spatially separated conductive layers.

8. The component according to claim 1, further comprising a resistive layer associated with the first type of electrode layer which connects at least two of the external contacts.

9. The component according to claim 8, wherein the resistive layer is on a surface of the foundation that connects the first pair of external contacts.

10. The component according to claim 8, wherein one of the first and second conductive layers and/or the resistive layer includes a pass-through portion.

11. The component according to claim 8, wherein the resistive layer comprises a paste containing ruthenium.

12. The component according to claim 1, which is manufactured by sintering a pile of stacked ceramic green foils.

13. The component according to claim 1, wherein the stacked electrode layers comprise multiple layers of the first type of electrode layer and multiple layers of the second type of electrode layer, the multiple layers of the first type of electrode layer alternating in a stack with the multiple layers of the second type of electrode layer.

14. The component according to claim 1, wherein the external contacts are manufactured by rolling a wheel coated with a conductive material.

15. The component according to claim 1, wherein areas of the first and second conductive layers differ by less than 10%.

16. The component according to claim 1, wherein areas of the first and second conductive layers differ by less than 20%.

17. The component according to claim 1, wherein a base area of the foundation is less than 2.5 mm$^2$.

18. A noise suppression circuit, comprising:
    a circuit board;
    plural components arranged on the circuit board; and
    circuit paths arranged on the circuit board which connect to the plural components;
    wherein at least one of the plural components comprises:
        stacked electrode layers arranged on a foundation, the stacked electrode layers comprising a first type of electrode layer and a second type of electrode layer;
        dielectric layers separating the stacked electrode layers to form at least one capacitor; and
        two pairs of external contacts arranged such that one external contact in each pair of external contacts is located on a side of the foundation and such that connections between each pair of external contacts overlap,
        wherein a first pair of the external contacts connects to the first type of electrode layer, and a second pair of the external contacts connects to the second type of electrode layer, and wherein the first type of electrode layer comprises a first conductive layer which connects to at least one of the first pair of external contacts and the second type of electrode layer comprises a second conductive layer which connects to at least one of the second pair of external contacts; and
    wherein areas of the foundation with external contacts are perpendicular to circuit paths that run parallel; and
    wherein two external contacts each are located along two outer circuit paths, and four external contacts are located along an inner circuit path.

19. The circuit according to claim 18, wherein the circuit paths comprise a ground wire that runs along an outer edge of the circuit paths and crosses other circuit paths associated with the components.

* * * * *

UNITED STATES PATENT AND TRADEMARK OFFICE
CERTIFICATE OF CORRECTION

PATENT NO.    : 6,850,404 B2  
DATED         : February 1, 2005  
INVENTOR(S)   : Gunter Engel, Gunther Greier and Walter Wittmer It is certified that error appears in the above-identified patent and that said Letters Patent is hereby corrected as shown below:

Column 7,  
Line 24, reads "the foundation in such", delete "in".  
Line 24, reads "that of one", delete "of".  
Line 25, reads "on a each side", delete "each".  
Line 36, delete ",".  
Lines 37-38 delete "is connected to an external contacts"  
Line 49, reads "second a conductive", delete "a".  
Line 49, reads "pair of we", delete "we".

Column 8,  
Line 42, reads "overlap," replace with -- overlap; --.

Signed and Sealed this

Twenty-fourth Day of May, 2005

JON W. DUDAS  
*Director of the United States Patent and Trademark Office*